US008384305B2

(12) United States Patent
Liao et al.

(10) Patent No.: US 8,384,305 B2
(45) Date of Patent: Feb. 26, 2013

(54) LED DRIVER WITH DIRECT AC-DC CONVERSION AND CONTROL, AND METHOD AND INTEGRATED CIRCUIT THEREFOR

(75) Inventors: Chia-Wei Liao, San Jose, CA (US); Jing-Meng Liu, Zhubei (TW); Roland Van Roy, Eindhoven (NL)

(73) Assignee: Richtek Technology Corporation, Hsin-Chu (TW)

( * ) Notice: Subject to any disclaimer, the term of this patent is extended or adjusted under 35 U.S.C. 154(b) by 297 days.

(21) Appl. No.: 12/711,515

(22) Filed: Feb. 24, 2010

(65) Prior Publication Data
US 2010/0225249 A1 Sep. 9, 2010

Related U.S. Application Data

(60) Provisional application No. 61/157,360, filed on Mar. 4, 2009, provisional application No. 61/223,375, filed on Jul. 6, 2009.

(51) Int. Cl.
*H05B 41/36* (2006.01)
(52) U.S. Cl. .......................... 315/294; 315/297
(58) Field of Classification Search .............. 315/224, 315/291, 294, 307, 312, 185 R, 186, 219, 315/276, 297
See application file for complete search history.

(56) References Cited

U.S. PATENT DOCUMENTS

| 6,690,146 | B2 * | 2/2004 | Burgyan et al. | 323/271 |
| 7,091,705 | B2 * | 8/2006 | Hoshino et al. | 323/222 |
| 7,369,384 | B2 * | 5/2008 | Inaba | 361/91.1 |
| 7,466,082 | B1 * | 12/2008 | Snyder et al. | 315/224 |
| 7,675,245 | B2 * | 3/2010 | Szczeszynski et al. | 315/291 |
| 7,812,552 | B2 * | 10/2010 | Yang | 315/294 |
| 7,852,649 | B2 * | 12/2010 | Hsiao | 363/97 |
| 7,855,520 | B2 * | 12/2010 | Leng | 315/307 |
| 7,906,917 | B2 * | 3/2011 | Tripathi et al. | 315/291 |
| 2004/0251854 | A1 * | 12/2004 | Matsuda et al. | 315/291 |
| 2007/0273681 | A1 * | 11/2007 | Mayell | 345/211 |
| 2008/0111800 | A1 * | 5/2008 | Wang et al. | 345/204 |

* cited by examiner

*Primary Examiner* — Jacob Y Choi
*Assistant Examiner* — Ephrem Alemu
(74) *Attorney, Agent, or Firm* — Tung & Associates

(57) ABSTRACT

The present invention discloses an LED driver with direct AC-DC conversion and control function, and a method and integrated circuit therefor. The LED driver comprises: a primary side circuit receiving rectified AC power, the primary side circuit including at least one power switch; a transformer coupled to the primary side circuit and controlled by the at least one power switch to convert a primary voltage to a secondary voltage which is supplied to an LED circuit; and a secondary side circuit coupled to the transformer, the secondary side circuit directly controlling current flowing through the LED circuit and sending a feedback signal to the primary side circuit to control the at least one power switch thereby.

16 Claims, 4 Drawing Sheets

LED DRIVER WITH DIRECT AC-DC CONVERSION AND CONTROL, AND METHOD AND INTEGRATED CIRCUIT THEREFOR

CROSS REFERENCE TO RELATED APPLICATIONS

This application claims the benefit of Provisional U.S. Patent Application No. 61/157,360 filed Mar. 4, 2009, and Provisional U.S. Patent Application No. 61/223,375 filed Jul. 6, 2009, both of which are incorporated by reference herein.

BACKGROUND OF THE INVENTION

1. Field of Invention

The present invention relates to an LED driver with direct AC-DC conversion and control function, and a method and an integrated circuit therefor.

2. Description of Related Art

FIG. 1 shows prior art circuitry to provide a regulated current output to LEDs from an AC power supply. It requires an AC-DC power converter 10 which converts an AC power to a regulated DC voltage, and an LED driver circuit 20 which receives the regulated DC voltage and provides a regulated current output. The AC-DC power converter 10 comprises a transformer 13, a primary side circuit 11, a secondary side circuit 12, a bridge rectifier 14, and other discrete devices such as capacitors and diodes, etc. (not shown). The secondary side circuit 12 detects its output voltage, and provides a corresponding feedback signal to a switching control circuit PWM in the primary side circuit 11 through photo coupling. The switching control circuit PWM controls the operation of a power switch P in the primary side circuit 11, so that the output voltage of the AC-DC power converter 10 is regulated.

The aforementioned prior art has the following drawback. Because it requires an AC-DC power converter 10 to generate a regulated voltage and an LED driver 20 to control current through LEDs according to the regulated voltage, this prior art needs at least three integrated circuit chips: the primary side circuit 11, the secondary side circuit 12, and the LED driver 20; it is not cost-effective.

For AC-DC power conversion, there is another prior art called LLC (inductor-inductor-capacitor) structure. Referring to FIG. 2, in addition to two inductors in the transformer 13, an additional capacitor is provided, so it is called LLC structure. In this LLC structure, the primary side circuit 11a is slightly different from that in FIG. 1; the voltage conversion by the transformer is controlled by an LLC controller 111 which controls the operations of two power switches P1 and P2 to regulate the output voltage. Although the overall architecture is slightly different from the first prior art, the drawback is the same, i.e., this prior art needs at least three integrated circuit chips: the primary side circuit 11a, the secondary side circuit 12, and the LED driver 20; it is not cost-effective.

In view of the foregoing, the present invention provides an LED driver with direct AC-DC conversion and control function, and a method and an integrated circuit therefor. Furthermore, the integrated circuit of the present invention can be applied not only to circuitry performing AC-DC conversion, but also to circuitry performing DC-DC conversion.

SUMMARY OF THE INVENTION

The first objective of the present invention is to provide an LED driver with direct AC-DC conversion and control function.

The second objective of the present invention is to provide a method for driving LEDs.

The third objective of the present invention is to provide an integrated circuit for controlling current through LEDs.

To achieve the objectives mentioned above, from one perspective, the present invention provides an AC-DC LED driver with direct AC-DC conversion and control, comprising: a primary side circuit receiving rectified AC power, the primary side circuit including at least one power switch; a transformer coupled to the primary side circuit and controlled by the at least one power switch to convert a primary voltage to a secondary voltage which is supplied to an LED circuit including a plurality of LEDs; and a secondary side circuit coupled to the transformer, the secondary side circuit directly controlling current flowing through the LED circuit and sending a feedback signal to the primary side circuit to control the primary side power switch.

In one embodiment of the aforementioned AC-DC LED driver, the secondary side circuit includes: at least one current source for controlling current through the LED circuit; an error amplifier for comparing a node voltage indicating operation condition of the current source with a reference voltage; and a transistor for controlling a corresponding current according to an output of the error amplifier. There are many ways to control current by the transistor. For example, the transistor can form a controllable current source directly, or form a controllable current source with other devices, or output a controlled voltage across a resistor to control the current.

Optionally, the aforementioned AC-DC LED driver may further comprise a voltage regulator for receiving the secondary voltage to generate a regulated voltage, wherein the voltage regulator is, e.g., a linear voltage regulator.

From another perspective, the present invention provides a method for controlling LEDs with direct AC-DC conversion, comprising: receiving rectified AC power; controlling a primary side of a transformer by at least one power switch to convert the rectified AC power to a secondary side output voltage which is supplied to an LED circuit including a plurality of LEDs; controlling current through the LED circuit by at least one current source; and feedback controlling the power switch, such that an operation voltage of the at least one current source is not lower than a minimum voltage required for normal operation. Optionally, the aforementioned method may further comprise: regulating the secondary side output voltage to generate a regulated voltage.

From another perspective, the present invention provides an integrated circuit for controlling current through LEDs of an LED circuit, the integrated circuit comprising: multiple LED current control circuits; a first error amplifier for comparing one of multiple voltages which indicate operation conditions of the multiple LED current control circuits with a reference voltage; and a first transistor for controlling a corresponding current according to an output of the first error amplifier.

The aforementioned integrated circuit can either be coupled to a secondary side of a transformer or an output terminal of a DC-DC switching regulator. The current controlled by the first transistor is used for controlling an optocoupler diode or feedback controlling a DC/DC switching regulator.

The aforementioned integrated circuit can further integrate whole or a part of a voltage regulator inside, wherein the voltage regulator can be, for instance, a linear voltage regulator.

The objectives, technical details, features, and effects of the present invention will be better understood with regard to the detailed description of the embodiments below.

DESCRIPTION OF THE PREFERRED EMBODIMENTS

Figure 1:
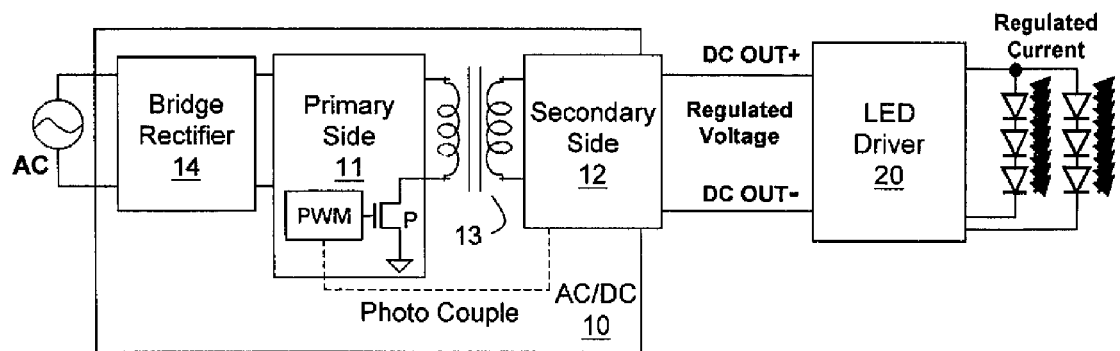
FIG. 1 shows that prior art requires an AC-DC power converter 10 to generate a regulated voltage and an LED driver 20 to control current through LEDs.
Figure 2:
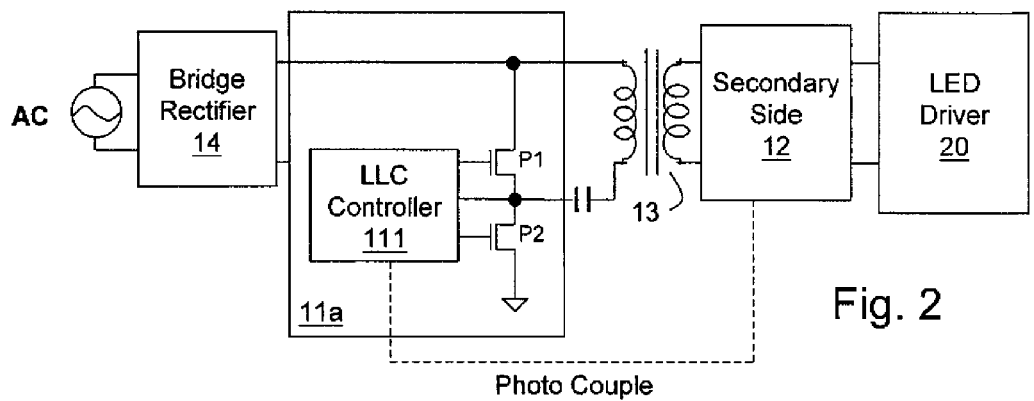
FIG. 2 shows a prior art LLC structure.
Figure 3:
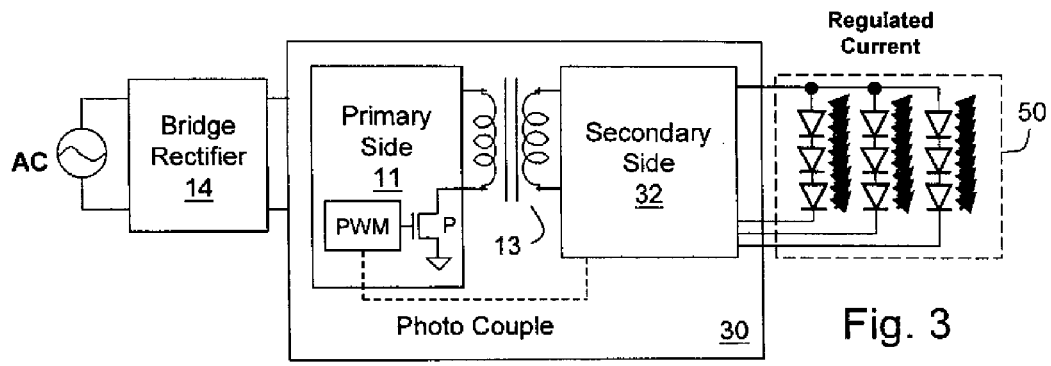
FIG. 3 shows a first embodiment of the present invention.

FIG. 3 shows a first embodiment of the present invention. In this embodiment, it is not required to use two integrated circuit chips, the secondary side circuit 12 and the LED driver 20. As shown in the figure, an LED driver 30 comprises: a primary side circuit 11 receiving rectified AC power; a transformer 13 coupled to the primary side circuit 11 to convert a primary voltage to a secondary voltage which is supplied to a load circuit 50; and a secondary side circuit 32 coupled to the transformer 13, the secondary side circuit 32 directly controlling current flowing through the load circuit 50 and sending a feedback signal to the primary side circuit 11 via photo coupling. The load circuit 50 is shown for example as an LED circuit, but it can be any other circuit which requires current control.

Figure 4:
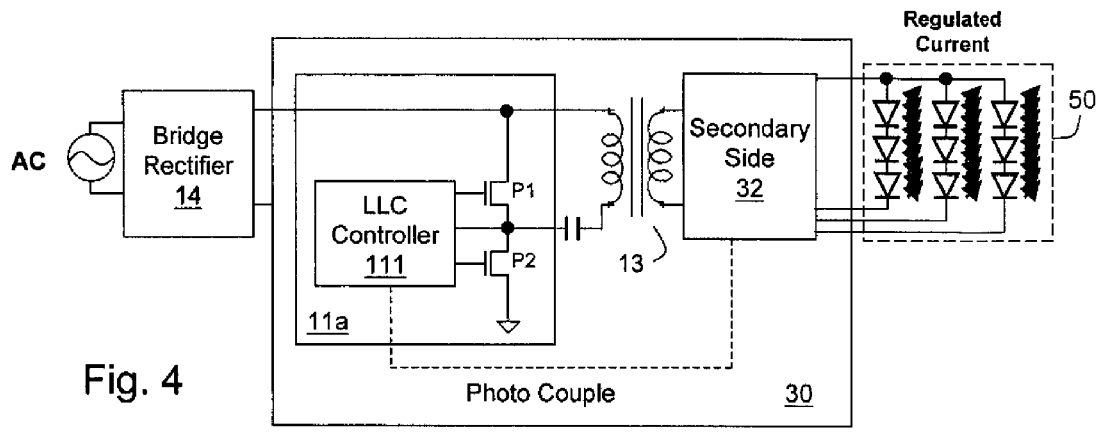
FIG. 4 shows an embodiment of the present invention applied to an LLC structure.

The concept "direct AC-DC conversion and control" of the present invention can also be applied to the LLC structure. As shown in FIG. 4, similar to the first embodiment, the secondary side circuit 32 directly controls current flowing through the load circuit 50 and sends a feedback signal to the primary side circuit 11 through photo coupling.

Hereinafter we take the structure shown in FIG. 3 as an example to describe the secondary side circuit 32 in detail. The circuit 32 can also be applied to the LLC structure shown in FIG. 4, and the drawing and description are omitted here.

Figure 5:
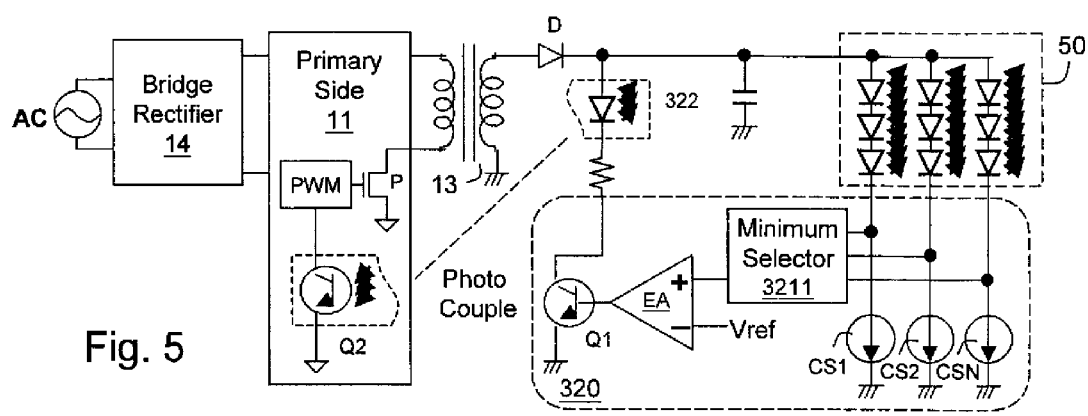
FIG. 5 shows an embodiment of a secondary side circuit 32.

Referring to FIG. 5, in this embodiment, the secondary side circuit 32 includes an integrated circuit 320, an opto-coupler diode 322, and a diode D. When the load circuit 50 includes multiple strings of LEDs, the integrated circuit 320 includes multiple current sources CS1 to CSN for controlling current through corresponding strings of LEDs. To make the current through every string of LEDs controllable, the current sources CS1 to CSN must operate by a voltage higher than a minimum voltage required for normal operation. The integrated circuit 320 further includes a minimum selector 3211 for selecting a lowest voltage among corresponding nodes of the LED strings. The voltages at the corresponding nodes indicate operation conditions of the corresponding current sources. The lowest voltage is inputted to an error amplifier EA to be compared with a reference voltage Vref therein. A transistor Q1 controlled by an output of the error amplifier EA controls a corresponding current through an opto-coupler diode 322. There are many ways to control current by the transistor Q1. For example, the transistor Q1 can directly form a controllable current source circuit, or form a controllable current source circuit with other devices, or output a controlled voltage across a resistor connected in series with one end of the transistor to control the current. In regard to the embodiment with a resistor, the resistor connected in series can be integrated in the integrated circuit 320, or provided outside the integrated circuit 320 as an adjustable external device for setting the current. What is shown in the figure is an embodiment wherein the resistor is connected externally. The opto-coupler diode 322 emits light which is fed back by photo coupling to an opto-coupler transistor Q2 in the primary side circuit 11. (The opto-coupler diode 322 and the opto-coupler transistor Q2 constitute one device called an opto-coupler.) A switching control circuit PWM controls the operation of a power switch P according to the feedback signal. As such, by feedback control mechanism, the operation voltages of all the current sources CS1 to CSN are higher than the minimum normal operation voltage, such that the current sources CS1 to CSN can normally operate to control current through corresponding LED strings. In other words, the LED driver 30 of the present invention directly controls current through the load circuit 50. If the load circuit 50 is only one path (one single LED string) instead of a parallel circuit with multiple paths, the integrated circuit 320 only needs one current source, and the minimum selector 3211 is not required.

Figure 6:
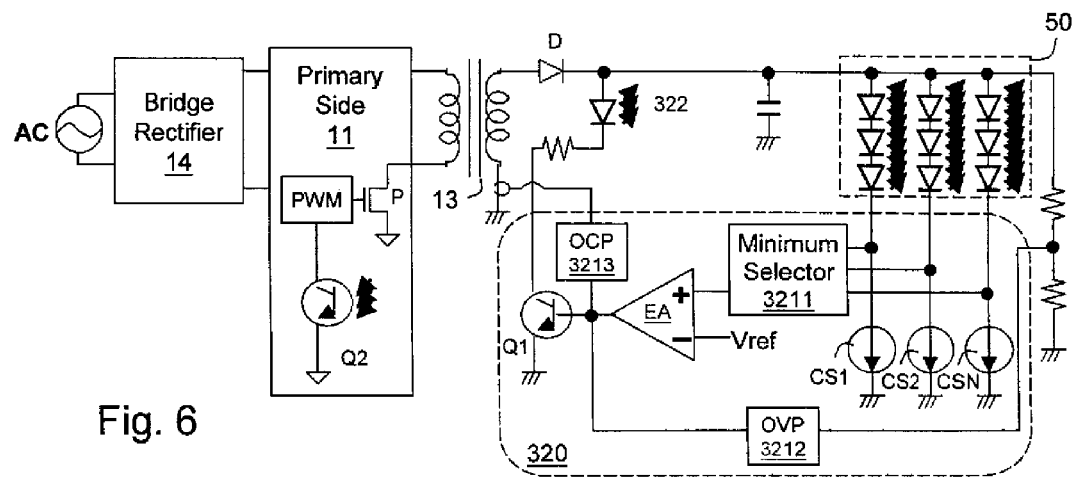
FIG. 6 shows another embodiment of the secondary side circuit 32.

FIG. 6 shows another embodiment. In this embodiment, the integrated circuit 320 further includes an over voltage protection (OVP) circuit 3212 and an over current protection (OCP) circuit 3213. The OVP 3212 operates for example as follows. It obtains a voltage dividend from the secondary side output voltage of the transformer 13; when the voltage dividend is too high, the OVP 3212 controls the transistor Q1, changing the feedback signal to reduce the secondary side output voltage of the transformer 13, or to pause the whole circuit. Likely, the OCP 3213 operates for example as follows. It detects the secondary side current of the transformer 13; when the current is too high, the OCP 3213 controls the transistor Q1, changing the feedback signal to reduce the secondary side current of the transformer 13, or to pause the whole circuit. Circuit details of the OVP and OCP will be further described later.

Figure 7:
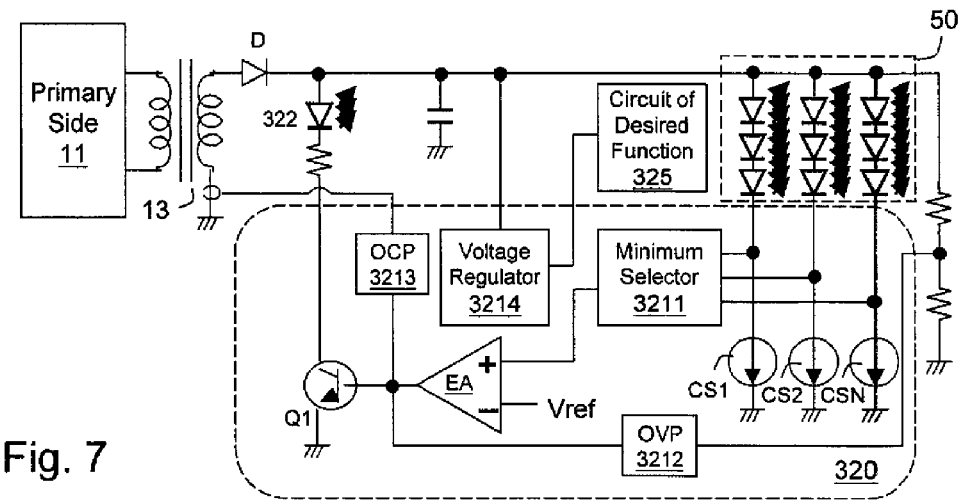
FIG. 7 shows another embodiment of the present invention, wherein the secondary side circuit 32 further includes a voltage regulator for providing a regulated voltage.

FIG. 7 shows another embodiment of the present invention. In the aforementioned embodiments, since the primary function of the LED driver 30 of the present invention is to provide regulated current to the load circuit 50, the secondary side output voltage of the transformer 13 is not regulated to a constant voltage; the output voltage is regulated only for purpose of ensuring that the current sources CS1 to CSN operate in optimum operation conditions. However in some applications, a regulated constant voltage is also required. To this, in this embodiment, the LED driver 30 further includes a voltage regulator 3214 which receives the secondary voltage (or the secondary side output voltage) of the transformer 13 and generates a regulated voltage to be provided to a circuit of desired function 325. The voltage regulator 3214 for example can be, but not limited to, a linear voltage regulator. The circuit of desired function 325 for example is a dimming control circuit for adjusting LED brightness, or any other circuit which requires a stable voltage. The voltage regulator 3214 can (but not necessarily) be partially or wholly integrated in the integrated circuit 320; so can be the circuit of desired function 325.

Figure 8:
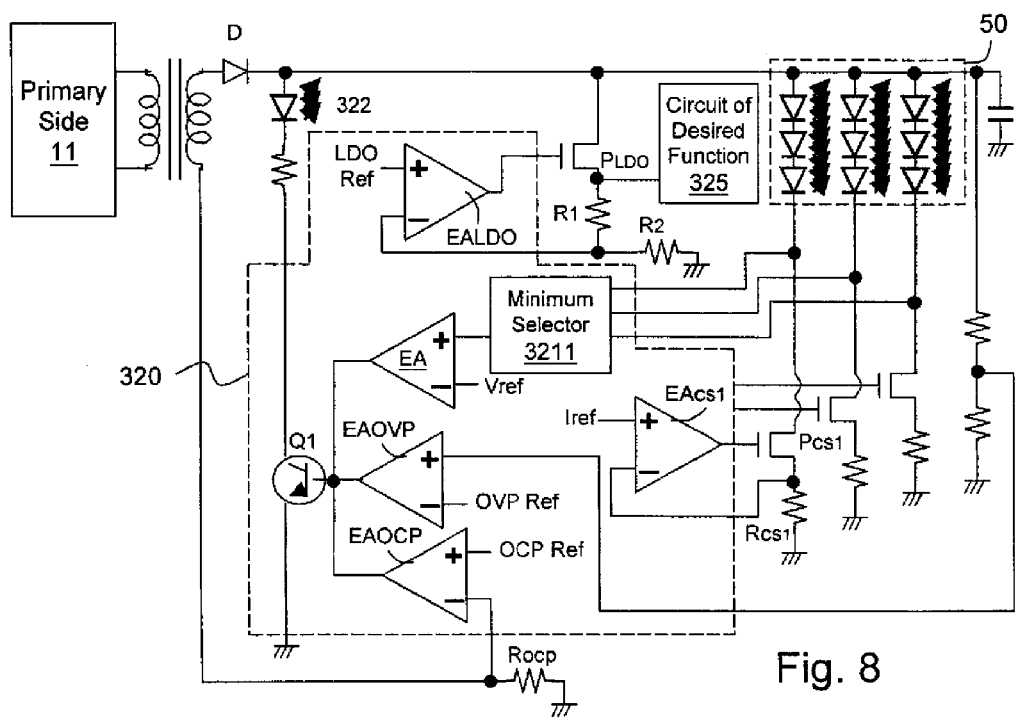
FIG. 8 shows an example of an integrated circuit 320 in more detail.

FIG. 8 shows another embodiment of the present invention, which illustrates more specific details. As shown in the figure, an error amplifier EAcs1, a transistor Pcs1, and a resistor Rcs1 form a current source CS1 for controlling current through a first string of LEDs (other current sources are not shown in detail for simplicity of the figure). In this embodiment, the transistor Pcs1 and the resistor Rcs1 are drawn as external devices to the integrated circuit 320, but they can certainly be integrated in the integrated circuit 320. An amplifier (or a comparator) EAOVP forms the OVP 3212. The amplifier EAOVP obtains a voltage dividend from the secondary side output voltage of the transformer 13, and compares the voltage dividend with a reference voltage OVP Ref, to generate a signal for controlling a transistor Q1. An amplifier (or a comparator) EAOCP and a resistor Rocp forms the OCP 3213. The resistor Rocp can be external to the integrated circuit 320 so that an over current limit can be set from outside. A product of the secondary side current of the transformer 13 and the resistor Rocp is compared with a reference voltage OCP Ref. A signal is generated according to the comparison result to control the transistor Q1. In this embodiment, the voltage regulator 3214 is a linear voltage regulator such as a low-drop out circuit (LDO) which includes an error amplifier EALDO, a transistor PLDO and resistors R1 and R2, whereby it regulates the secondary side voltage of the transformer 13 to provide a regulated voltage to the circuit of desired function 325. In this embodiment, the transistor PLDO and resistors R1 and R2 are external to the integrated circuit 320.

Figure 9:
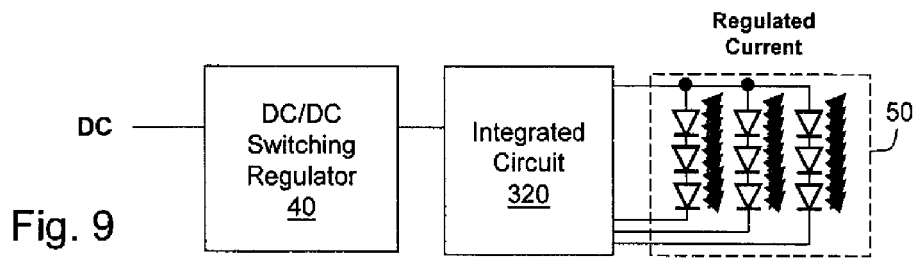
FIG. 9 illustrates that the integrated circuit 320 also can be coupled to a DC-DC switching regulator 40.
Figure 10:
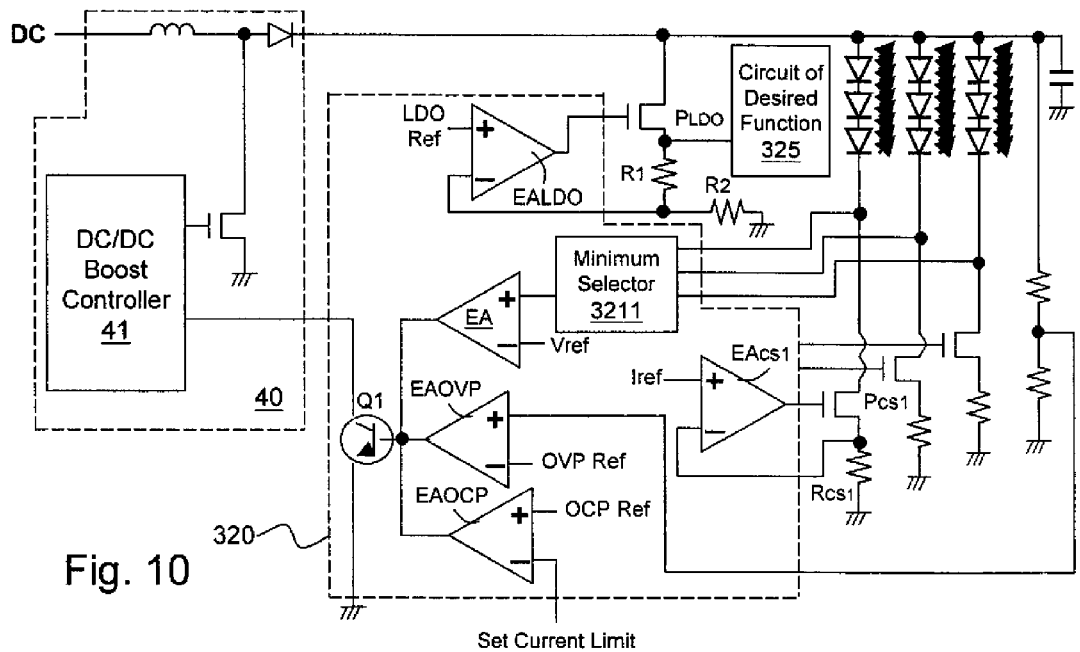
FIG. 10 shows an example of the structure shown in FIG. 9 in more detail.

Besides an advantage of achieving AC-DC conversion and LED current control in one circuit, the present invention has another advantage, that is, the aforementioned integrated circuit 320 is not limited to be applied to the secondary side of the AC-DC conversion circuit. Referring to FIG. 9, the integrated circuit 320 can be coupled to a DC-DC switching regulator 40, for controlling current through the load circuit 50 according to voltage generated from the DC-DC switching regulator 40. FIG. 10 shows an example of the circuit structure in detail. The DC-DC switching regulator 40 is a boost conversion circuit for example. According to the present invention, a feedback signal generated from the transistor Q1 can be provided to a DC-DC boost controller 41 of the DC-DC switching regulator 40 directly (i.e., not by photo coupling) for controlling the power switch. Thus, the integrated circuit 320 of the present invention has an advantageous characteristic that it is multi-functional; it can either be coupled to a secondary side of a transformer or to an output terminal of a DC-DC switching regulator.

Figure 11:
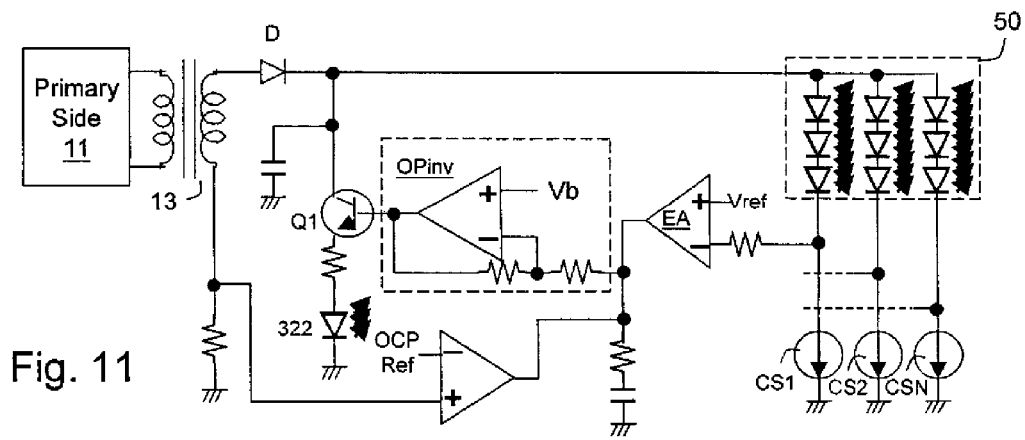
FIG. 11 shows another embodiment of the present invention.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, referring to FIG. 11, the error amplifier EA can control the transistor Q1 through the circuit OPinv. Thus, the opto-coupler diode 322 can be coupled to the emitter instead of the collector of the transistor Q1. In view of the foregoing, the spirit of the present invention should cover all such and other modifications and variations, which should be interpreted to fall within the scope of the following claims and their equivalents.

Furthermore, safety protection and other function improvements as described in US publications US 2008/0094349, US 2008/0180386 and US 2008/0180387 filed by the same applicant can also be applied in the circuit structure of the present invention. All such and other applications and combinations should be interpreted to fall within the scope of the following claims and their equivalents.

What is claimed is:

1. An AC-DC LED driver with direct AC-DC conversion and control, comprising:
    a primary side circuit receiving rectified AC power, the primary side circuit including at least one power switch;
    a transformer coupled to the primary side circuit and controlled by the at least one power switch to convert a primary voltage to a secondary voltage which is supplied to an LED circuit including a plurality of LEDs;
    a secondary side circuit coupled to the transformer, the secondary side circuit directly controlling current flowing through the LED circuit and sending a feedback signal to the primary side circuit to control the primary side power switch, wherein the secondary side circuit includes at least one current source for controlling a corresponding current through corresponding LEDs; and
    a voltage regulator for receiving the secondary voltage and generating a regulated voltage from the secondary voltage.

2. The AC-DC LED driver of claim 1, wherein the secondary side circuit further includes:
    an error amplifier for comparing a node voltage indicating operation condition of the current source with a reference voltage; and
    a transistor for controlling a corresponding current according to an output of the error amplifier.

3. The AC-DC LED driver of claim 1, wherein the plurality of LEDs are grouped into multiple strings of LEDs, each string having a respective voltage node, and the secondary side circuit includes:
    multiple current sources for controlling currents through corresponding strings of LEDs respectively;
    a minimum selector for selecting a lowest voltage among the nodes of the LED strings;
    an error amplifier for comparing an output of the minimum selector with a reference voltage; and
    a transistor for controlling a corresponding current according to an output of the error amplifier.

4. The AC-DC LED driver of claim 2, further comprising an opto-coupler diode coupled to the transistor for generating a feedback signal to the primary side circuit through photo coupling.

5. The AC-DC LED driver of claim 3, further comprising an opto-coupler diode coupled to the transistor for generating a feedback signal to the primary side circuit through photo coupling.

6. The AC-DC LED driver of claim 1, wherein the voltage regulator is a linear voltage regulator.

7. The AC-DC LED driver of claim 6, wherein the linear voltage regulator is a low drop-out (LDO) voltage regulator.

8. A method for controlling LEDs with direct AC-DC conversion, comprising;
    receiving rectified AC power;
    controlling a primary side of a transformer by at least one power switch to convert the rectified AC power to a secondary side output voltage which is supplied to an LED circuit including a plurality of LEDs;
    controlling current through the LED circuit by at least one current source;

feedback controlling the power switch, such that an operation voltage of the at least one current source is not lower than a minimum voltage required for normal operation; and regulating the secondary side output voltage to generate a regulated voltage.

9. The method of claim 8, wherein the step of regulating the secondary side output voltage to generate a regulated voltage is done by a linear voltage regulator.

10. An integrated circuit for controlling current through LEDs of an LED circuit, the integrated circuit comprising:

multiple LED current control circuits;

a first error amplifier for comparing one of multiple voltages which indicate operation conditions of the multiple LED current control circuits with a reference voltage; and a first transistor for controlling a corresponding current according to an output of the first error amplifier, wherein the integrated circuit has a multi-functional characteristic that it can serve as a circuit coupled to a secondary side of a transformer and it can also serve as a circuit coupled to an output terminal of a DC-DC switching regulator.

11. The integrated circuit of claim 10, wherein when the integrated circuit serves as a circuit coupled to a secondary side of a transformer, the current controlled by the first transistor is used for controlling an opto-coupler diode, and when the integrated circuit serve as a circuit coupled to an output terminal of a DC-DC switching regulator, the current controlled by the first transistor is used for feedback controlling a DC-DC switching regulator.

12. The integrated circuit of claim 10, wherein the current control circuits are current sources.

13. The integrated circuit of claim 10, wherein each of the current control circuits is a second error amplifier, which forms a current source together with a second transistor and a resistor which are external to the integrated circuit.

14. The integrated circuit of claim 10, further comprising: a voltage regulator which receives a voltage and generates a regulated voltage.

15. The integrated circuit of claim 10, further comprising: a second error amplifier, which forms a linear voltage regulator together with a second transistor and a resistor which are external to the integrated circuit.

16. The integrated circuit of claim 10, further comprising: a minimum selector which selects a lowest voltage among multiple voltages indicating operation conditions of the multiple current control circuits, and inputs the selected one to the first error amplifier.

* * * * *